(12) United States Patent
Modave

(10) Patent No.: US 7,516,902 B2
(45) Date of Patent: Apr. 14, 2009

(54) PROTECTION OF A MICROCONTROLLER

(75) Inventor: Jean-Louis Modave, Ottignies (BE)

(73) Assignee: Proton World International N.V., Zaventem (BE)

( * ) Notice: Subject to any disclaimer, the term of this patent is extended or adjusted under 35 U.S.C. 154(b) by 0 days.

(21) Appl. No.: 11/283,096

(22) Filed: Nov. 18, 2005

(65) Prior Publication Data
US 2006/0112436 A1 May 25, 2006

(30) Foreign Application Priority Data
Nov. 19, 2004 (FR) .................................. 04 52701

(51) Int. Cl.
*G06K 19/06* (2006.01)
(52) U.S. Cl. ...................... 235/492; 235/439
(58) Field of Classification Search ............... 235/439, 235/192; 726/22, 34
See application file for complete search history.

(56) References Cited
U.S. PATENT DOCUMENTS
4,211,919 A * 7/1980 Ugon .......................... 235/487
4,734,568 A * 3/1988 Watanabe .................... 235/487
4,983,816 A * 1/1991 Iijima ......................... 235/379
5,465,349 A 11/1995 Geronimi et al.
2001/0010331 A1 8/2001 Hazard
2004/0078589 A1* 4/2004 Giraud ........................ 713/200
2007/0220603 A1* 9/2007 Chamberot .................. 726/22

FOREIGN PATENT DOCUMENTS
WO WO 01/03084 A1 1/2001

OTHER PUBLICATIONS
French Search Report from French Patent Application 04/52701, filed Nov. 19, 2004.

* cited by examiner

*Primary Examiner*—Seung H Lee
(74) *Attorney, Agent, or Firm*—Lisa K. Jorgenson; James H. Morris; Wolf, Greenfield & Sacks, P.C.

(57) ABSTRACT

A method for protecting at least one section of a program executed by a microcontroller, included before execution of the section, decrementing or incrementing at least one first counter and storing its state in a non-volatile memory of the microcontroller; in case of the detection of an attack attempt by the microcontroller, activating a flag in the microcontroller RAM; and at the end of the execution of the program section, checking the flag state.

16 Claims, 3 Drawing Sheets

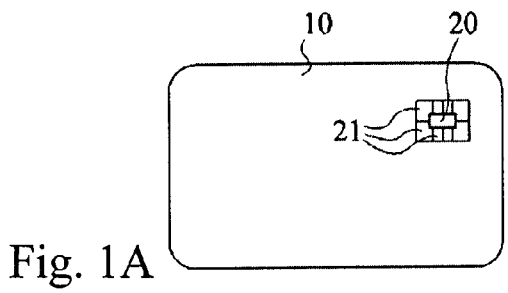
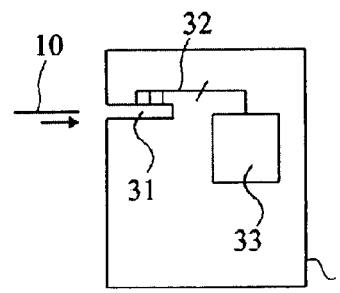
Fig. 1A (Prior Art)
Fig. 2A (Prior Art)
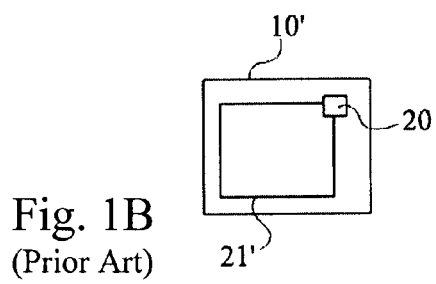
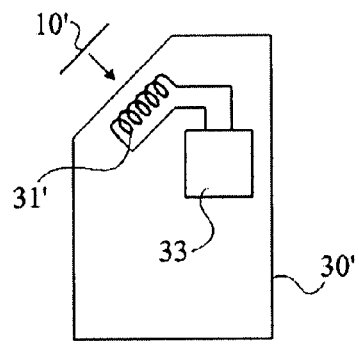
Fig. 1B (Prior Art)
Fig 2B (Prior Art)
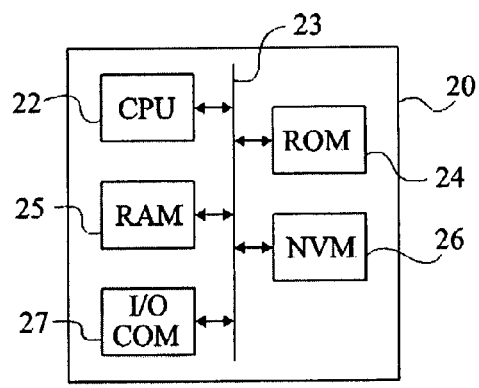
Fig. 3 (Prior Art)
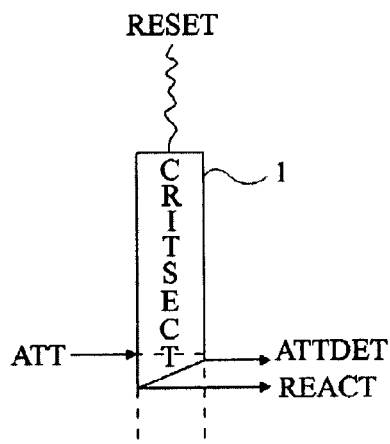
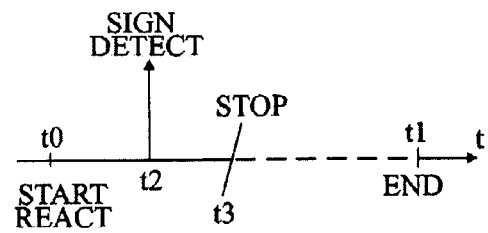
Fig. 4A (Prior Art)
Fig. 4B (Prior Art)

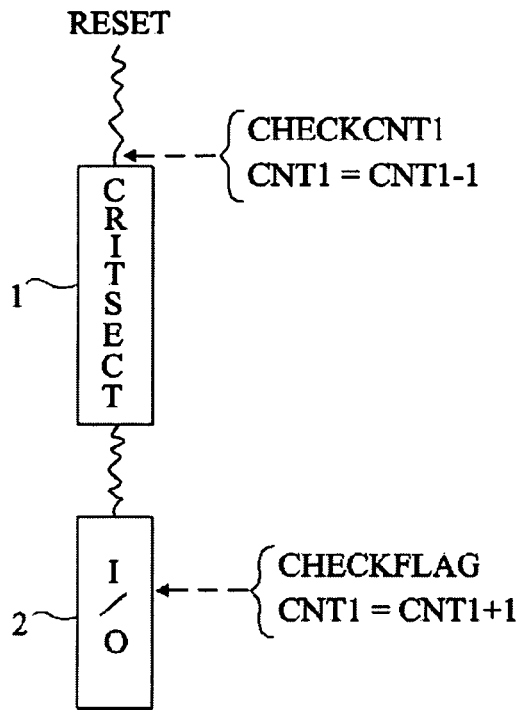
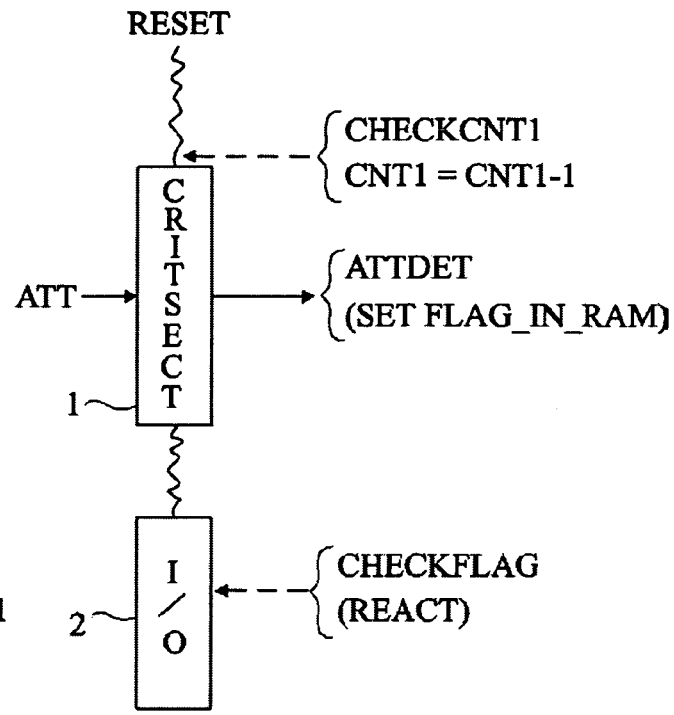
Fig 5A
Fig 5B
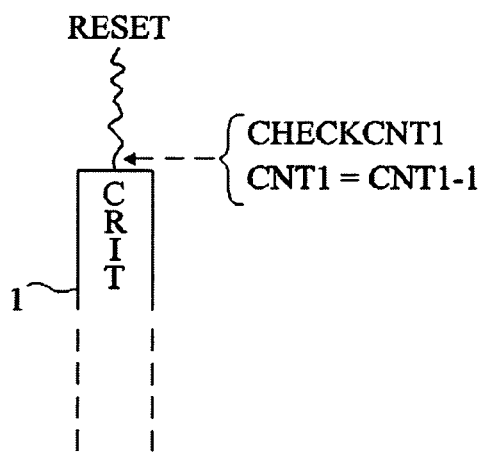
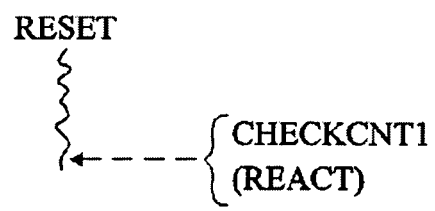
Fig 6A
Fig 6B

PROTECTION OF A MICROCONTROLLER

BACKGROUND OF THE INVENTION

1. Field of the Invention

The present invention generally relates to the protection of information contained in an integrated circuit, for example, in a smart card or the like, with or without contact. The present invention more specifically relates to the protection of critical information contained in an integrated circuit of a smart card or the like against attacks aimed at preventing the card from being disabled after a fraud attempt detection.

2. Discussion of the Related Art

FIGS. 1A and 2A very schematically show an example of a smart card system 10 (FIG. 1A) with contacts, of the type to which the present invention applies. Card 10 supports an integrated circuit chip 20 capable of communicating with a terminal 30 (FIG. 2A) via contacts 21. When card 10 (FIG. 2A) is introduced in a slot 31 of the terminal, contacts 21 of card 10 enter in electric relation with other contacts 32 of terminal 30 to communicate with a computer system 33 thereof.

FIGS. 1B and 2B very schematically show an example of a contactless electronic card or label 10' (FIG. 1B) of the type to which the present invention applies. In this case, integrated circuit chip 20 supported by electronic label 10' is connected to an antenna 21' forming the inductive element of a resonant circuit of the transponder thus formed. This antenna 21' is intended to communicate by close magnetic coupling with an antenna 31' of a terminal 30' when label 10' (FIG. 2B) is in the electric field radiated by antenna 31'. Antenna 31' is connected to a computer system 33 of terminal 30'. Electromagnetic transponder 10' may be brought to a smart card, the antenna being then generally formed of a planar conductive winding supported by the card. It may also be a dual smart card combining the communication functions with and without contact.

FIG. 3 very schematically shows in the form of blocks elements of an integrated circuit chip 20 of the type to which the present invention applies equipping, for example, a smart card with or without contacts.

Integrated circuit 20 forms a microcontroller comprising a central processing unit 22 (CPU) communicating via a bus 23 with different memories, among which at least a memory 24 (ROM), for example, a read-only memory or a FLASH memory, for storing programs to be executed, a RAM 25 used in the execution of programs, and a non-volatile rewritable memory 26 (NVM) (for example, an EEPROM). Chip 20 also comprises input/output ports (I/O COM) 27 towards the outside. These input/output ports are connected either to contacts (for example, contacts 21 of a smart card—FIG. 1A), or to a contactless transmit element (for example, antenna 21' of an electromagnetic transponder—FIG. 1B).

FIGS. 4A and 4B very schematically illustrates the operation of a program having at least one portion processing critical information (for example, one or several secret keys or cryptography algorithms) undergoing an attack attempt by a hacker aiming at obtaining all or part of the critical information.

After a reset of the circuit microprocessor (20, FIG. 3) of the concerned smart card, different processings are implemented by its central unit according to applications. It is assumed that in the development of its main program (FIG. 5A), a so-called critical section 1 (CRITSECT) processing critical data (for example, key, secret code, or algorithm) to be protected, that is, that must be prevented from coming out from the integrated circuit in which they are to be found, intervenes. This amounts to avoiding the data output through the input/output interface (27, FIG. 3) with or without contact of the integrated circuit when a disturbance is detected.

It is assumed that, in the development of critical section 1, an attack ATT coming from a person attempting to fraud by discovering the card's secret occurs. Such an attack may take different forms. For example, the case in point may be to introduce a disturbance into the component to cause an instruction jump in the development of the critical section and thus obtain the data. The case in point may also be to disturb the execution of the critical section by luminous excitation or to introduce a drift in the component clock. Since the hacker does not, in principle, have access to the program executed by the actual component, such attacks generally cause a physical disturbance on the component.

Conventionally, the protected integrated circuit chips are capable of detecting a hacking attempt within a critical section. This detection (ATTDET) of an attack may take different forms. For example, it is known to detect in hardware fashion a drift in the component clock, the occurrence of a significant luminous excitation or of an electric disturbance on the integrated circuit. In software fashion, the execution of the critical section may be protected by a periodic checking of the software code based on an authentication key stored in a memory of the integrated circuit. Such a calculation is generally called a signature calculation to check the proper execution of the software code in uninterrupted fashion. In the case of an interrupt, the signal is not checked, which enables detection.

Traditionally, after detection of an attack on an integrated circuit chip, the data output from the card must be prevented. To achieve this, the program for processing the disturbance detection generates a card blocking action (REACT). This action generally translates as the writing or the deleting of one or several bits in a rewritable non-volatile memory (26, FIG. 3), for example, of EEPROM or FLASH type. The object of this action is to disable any subsequent operation of the chip to prevent the hacker from repeating his attack. Indeed, an attack must be repeated several times on a same component to enable discovering the secret of an integrated circuit. This repetition and the analysis of the results provided after the interrupts are generally statistically processed based on assumptions made by the pirate to discover the circuit's secret.

A problem which arises is that this action (REACT) generally translates as a strong electric signature of the component (higher power consumption of the integrated circuit), which enables the hacker to detect the attempt to write into the non-volatile memory during the critical section. Such a detectable signature enables the hacker to abruptly interrupt the provision thereto of any signal enabling it to carry on its software execution. The hacker then prevents the card blocking, which enables him to repeat his attack such as illustrated in FIG. 4A. He repeats the attack, possibly by modifying one or several parameters, until one of these attacks succeeds in not being detected and data are then provided by the circuit.

FIG. 4B illustrates, in the form of a very simplified timing diagram, such a reaction of a person attempting fraud after an attempt to block the integrated circuit.

Whatever the action taken by the card, this action will take some time before reaching the blocking. The example of FIG. 4B illustrates the duration of a command, for example, for writing into an EEPROM, starting at a time t0 (START REACT) to end in principle at a time t1 (END).

A hacker, knowing that his attacks are likely to be detected by the smart card, watches over the electric signature of the card to detect a significant variation in the execution of a critical section (SIGN DETECT). For example, this detection occurs at a time t2 before the end of the execution of the control by the card. After this detection, the person attempting to fraud almost immediately stops (time t3, STOP) any operation of the card to prevent the blocking from being complete.

Of course, such actions are in practice automatically performed by a tool programmed for this purpose, which enables fast reaction. In the case of a smart card with contacts, this amounts to abruptly interrupting all contacts between card 10 (FIG. 1A) and its reader 30 (FIG. 2A) to deprive it from any power supply and clock signal. In the case of a contactless card 10' (FIG. 1B), this amounts to an immediate suppression of any radio-frequency transmitted by reader 30' (FIG. 2B) depriving the card from power supply and clock.

The present invention will be described hereafter in relation with an example of application to smart cards with contacts. It should however be noted that it more generally applies not only to contactless smart cards but also to any electronic element containing a microcontroller integrating one or several memories likely to contain information which are desired to be protected against piracy attempts by repetition of attacks and actions aiming at preventing the blocking of the integrated circuit by detection of an electric signature thereof.

SUMMARY OF THE INVENTION

The present invention aims at overcoming the disadvantages of known microcontrollers and, more specifically, at protecting the critical information contained in such a microcontroller after detection of an attack attempt by program interrupt to obtain the data on the input/output ports of the microcontrollers.

The present invention also aims at protecting the execution of a program after detection of errors in the program sequencing, especially by fault injection in its execution.

The present invention also aims at providing a solution compatible with an execution on a microcontroller of a smart card or of an electronic tag.

To achieve all or part of these objects as well as others, the present invention provides a method for protecting at least one section of a program executed by a microcontroller, comprising:

before execution of said section, decrementing or incrementing at least one first counter and storing its state in a non-volatile memory of the microcontroller;

in case of the detection of an attack attempt by the microcontroller, activating a flag in the microcontroller RAM; and at the end of the execution of said program section, checking the flag state.

According to an embodiment of the present invention, the state of the first counter is checked against a first threshold before execution of said section to implement a protection reaction in case the threshold is exceeded.

According to an embodiment of the present invention, said checking is also performed before providing information at the microcontroller input/output.

According to an embodiment of the present invention, a second counter is decremented or incremented if said RAM flag is, at the end of the critical section, not activated.

According to an embodiment of the present invention, the second counter is tested against a second threshold before execution of the section.

According to an embodiment of the present invention, the second counter is incremented at the end of the execution of said section.

According to an embodiment of the present invention, the initial state of the first counter is set to a value randomly selected from a range.

According to an embodiment of the present invention, said threshold is set to a value randomly selected from a range.

The present invention also provides a microcontroller comprising at least a central unit, a RAM, a non-volatile memory, and an input/output port, at least one area of the non-volatile memory being intended for the storage of the state of at least one first counter for the implementation of the method for protecting at least one section of a program.

According to an embodiment of the present invention, at least one area of the RAM is intended for the storage of a flag indicative of a detection of a possible attack.

The foregoing and other objects, features, and advantages of the present invention will be discussed in detail in the following non-limiting description of specific embodiments in connection with the accompanying drawings.

BRIEF DESCRIPTION OF THE DRAWINGS

FIGS. 1A and 1B, previously described, very schematically show two examples of microcontrollers of the type to which the present invention applies;

FIGS. 2A and 2B, previously described, show two examples of terminals of the type to which the present invention applies;

FIG. 3, previously described, very schematically illustrates in the form of blocks an example of a microcontroller contained in an electronic element of the type to which the present invention applies;

FIGS. 4A and 4B, previously described, are intended to show the state of the art and the problem to solve;

FIGS. 5A and 5B very schematically illustrate, respectively with no attack and in case of an attack, a first embodiment of the method according to the present invention;

FIGS. 6A and 6B illustrate an alternative embodiment of the method of the present invention, respectively in the operations of FIGS. 5A and 5B.

DETAILED DESCRIPTION

Figure 7:
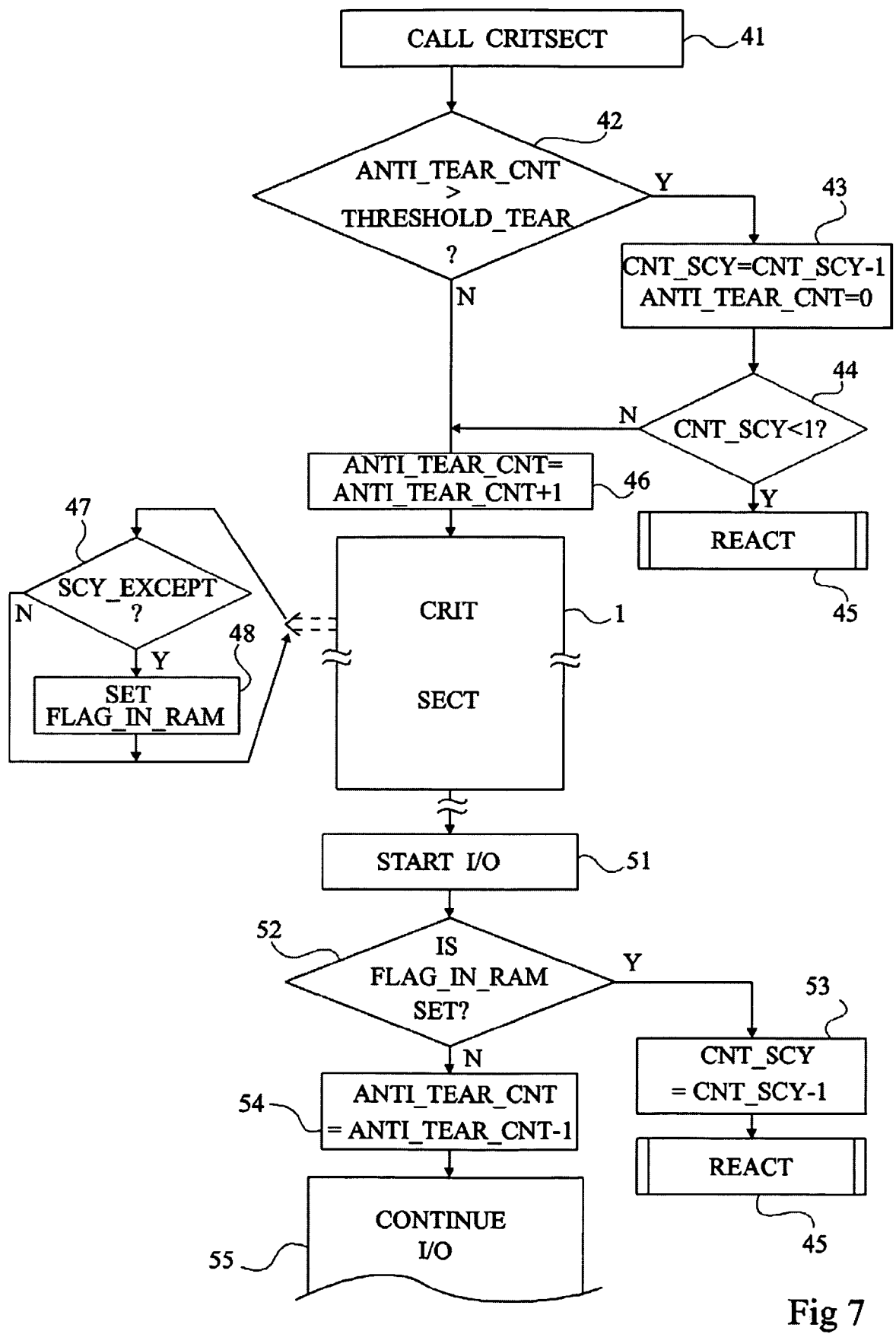
FIG. 7 shows a simplified diagram of an embodiment of the protection method according to a preferred embodiment of the present invention.

The same elements have been designated with the same reference numerals in the different drawings. For clarity, only those elements which are useful to the understanding of the present invention have been shown in the drawings and will be described hereafter. In particular, the different programs executed by the microcontroller to which the present invention applies, be it program implementing critical data or not, have not been described in detail, the present invention applying whatever the application of the microcontroller and the programs that it executes. Further, the respective structures of the microcontrollers and of the card or transponder readers have not been described in detail, the present invention being here again compatible with any conventional smart card system with or without contact, provided that these smart cards are with a microcontroller.

According to an embodiment of the present invention, when an attack by fault injection in a section critical from the point of view of security of data contained in the microcontroller is detected by said microcontroller, this generates no immediate card blocking attempt by an action of write type into the non-volatile memory (EEPROM or FLASH). In such detection, the microcontroller causes the writing of a bit or of a word of flag type in the RAM and carries on the processing of the critical section as if nothing had occurred.

The writing of a flag in a RAM is not detectable by the possible hacker. Indeed, on execution of any portion of a program, including a critical section, many RAM accesses occur for temporary data or code portion storage. The electric signal of the component is not significantly modified by the writing of a flag used for the protection provided by the present invention.

After, at the end of a critical section and before execution of the input/output sub-program or at the beginning of this sub-program, the flag state is tested to take the possible necessary measures before allowing the output of data or information outside the microcontroller.

Preferably, the action taken by the microcontroller as a response to an active state of the flag, that can take the form of any conventional reaction to a hacking attempt, like the deleting of a non-volatile memory area or the writing of a blocking flag into the EEPROM, is masked by an updating of at least one counter systematically performed in the non-volatile memory, whether an attack has occurred or not.

FIGS. 5A and 5B very schematically illustrate an example of execution of a program by a microcontroller according to a first embodiment of the present invention, respectively with no attack attempt and with an attack attempt detection in a critical section of the program.

As previously, an algorithmic processing in a microcontroller generally starts with a reset which follows, for example, the introduction of a smart card in a reader with contacts.

According to this preferred embodiment, before the beginning of a critical section (block 1, CRITSECT), the protection program checks the state of a counter CNT1 (CHECKCNT1) stored in the non-volatile memory (26, FIG. 3). If the state of this counter is in accordance with an expected state as will be seen hereafter in relation with FIGS. 6A and 6B, the counter is, for example, decremented (CNT1=CNT1−1) and the execution of the critical section starts.

In FIG. 5A, a normal development of the critical section is assumed while in FIG. 5B, the presence of an attack ATT by fault injection in the algorithm execution and a detection ATTDET of this attack by the microcontroller are assumed. After this detection, the microcontroller modifies, in the RAM, the state of a flag FLAG_IN_RAM (SET FLAG_IN_RAM) and lets the execution of critical section 1 reach its end. Thus, for the possible hacker, everything occurs as if his attack had not been detected.

At the end of critical section 1, the program execution carries on normally until execution of an input/output sub-program (block 2, I/O) during which data are supposed to be extracted from the microcontroller. In this input/output routine, and before data have been provided on input/output ports (27, FIG. 3) of the microcontroller, a test of the state of the protection flag (CHECKFLAG) is provided. If the state of this flag indicates the absence of an attack detection, counter CNT1 is incremented (CNT1=CNT1+1) and the input/output sub-program carries on normally. However, if the flag state in the RAM indicates the detection of an attack, the writing of the new state of the counter is replaced with an action (REACT) against the hacking attempt.

It can already be seen that, since the state of counter CNT1 is preferentially stored in the non-volatile memory, its updating generates an electric signature of same nature as the writing of a blocking bit into the EEPROM or the deleting of a flash memory area as a reaction to a hacking attempt.

There may however remain a risk for the person attempting to fraud to prevent the writing into the non-volatile memory during the input/output sub-program. This is why, according to a preferred embodiment, the counter state is checked before starting critical section 1.

FIGS. 6A and 6B illustrate a subsequent restarting of the microcontroller respectively in the absence of a hacking attempt at the previous execution (FIG. 5A) and in the presence of an attack detected at this previous execution (FIG. 5B).

In the first case, checking CHECKCNT1 of the state of counter CNT1 is in accordance with what is expected, said counter having been respectively decremented, then incremented in the previous execution, its content remains at a value likely to be tested as a threshold. Since the counter state is correct, it is decremented again, CNT1=CNT1−1, before the next execution of critical section 1, as illustrated in FIG. 5A.

In the case where an attack has been detected and where a reaction REACT has not been carried through by the input/output program, for example, under the effect of an abrupt stopping of any supply by the person attempting to fraud after detection of an attempt to write into the non-volatile memory, the checking of the state of counter CHECKCNT1 results in a problem detection. Indeed, said counter has not been incremented at the previous execution. The protection program then causes reaction REACT which has not reached its end at the previous execution.

If the hacker attempts again to avoid reaction REACT after a detection of the electric signature of the action taken by the protection algorithm, this is not disturbing since he then stops any execution by the microcontroller and thus has no access to the critical section. Accordingly, at worst, he will access only once to the critical section. Even if data have been provided at the first execution, this is generally not a problem since several executions are necessary to discover the secret of the critical data contained in a microcontroller.

Preferably, the state that protection counter CNT1 must respect is different from one microcontroller to another to avoid successive attacks based on several smart cards. For example, this counter (or the detection threshold of a problem) is set to a value within a range, this value being randomly drawn from this range. Such an initialization of the counter is performed, for example, on manufacturing or on first use of the microcontroller.

FIG. 7 shows a timing diagram illustrating a second preferred embodiment of the present invention.

According to this embodiment, two counters are used and are compared with thresholds to condition the detection of a fraud attempt. The use of two counters enables, among others, avoiding a microcontroller blocking due to a wrong detection, for example, in case of an incidental malfunction of the reader which would be detected as a fraud attempt. The counter states are, preferably, stored in the non-volatile memory (26, FIG. 3) of the microcontroller.

According to this embodiment, a first counter CNT_SCY is initialized at a value randomly drawn from a range (for example, between 1 and 16). A second counter ANTI_TEAR_CNT is initialized at 0 and a threshold THRESHOLD_TEAR is randomly drawn from a range (for example, between 1 and 16) by the microcontroller and stored in the non-volatile memory.

The timing diagram of FIG. 7 starts with the call to the critical function to be protected (block 41, CALL CRITSECT). Before execution of the actual critical section, the state of counter ANTI_TEAR_CNT is tested (block 42, ANTI_TEAR_CNT>THRESHOLD_TEAR?) against threshold THRESHOLD_TEAR.

If the threshold is exceeded (output Y of block 42), second counter CNT_SCY is decremented and counter ANTI_TEAR_CNT is reset to 0 (block 43, CNT_SCY=CNT_SCY-1 ANTI_TEAR_CNT=0). Then, the state of the first counter is tested (block 44, CNT_SCY<1?) against a threshold, for example, equal to 1. If the count of counter CNT_SCY is zero (output Y of block 44), the protection program starts an adapted reaction sub-program (block 45, REACT), for example, a blocking of the chip by writing into its non-volatile memory. In the opposite case (output N of block 44), it is returned to the main branch of the protection program corresponding to output N of block 42.

Test 42 amounts to allowing a number of interrupts of the critical section before triggering reaction REACT.

Test 44 corresponds to the security for the case where the hacker prevents action REACT at the end of the program.

Counter ANTI_TEAR_CNT is then incremented by 1 (block 46, ANTI_TEAR_CNT=ANTI_TEAR_CNT+1). Then, critical section 1 is normally executed, except that on detection of an attack attempt, also called security exception SCY_EXEPT, RAM flag FLAG_IN_RAM is activated (blocks 47, SCY_EXEPT? and block 48, SET FLAG_IN_RAM).

At the end of the execution of the critical section, the program continues normally until the beginning of the input/output sub-program (block 51, START I/O).

According to this preferred embodiment of the present invention, at the beginning of this routine, the program tests the state of flag FLAG_IN_RAM (block 52, IS FLAG_IN_RAM SET?). If the flag is active (output Y of block 52), this means that an attack attempt has been detected, counter CNT_SCY is then decremented by 1 (block 53, CNT_SCY=CNT_SCY-1) and the protection program generates a reaction to the hacking (block 45, REACT). If this action fails, it will be retired on next execution at the beginning of the program. If flag FLAG_IN_RAM has remained inactive (output N of block 52), counter ANTI_TEAR_CNT is decremented (block 54, ANTI_TEAR_CNT=ANTI_TEAR_CNT-1) and the input/output program for providing data to the outside of the microcontroller carries on normally (block 55, CONTINUE I/O).

The embodiment of FIG. 8 further improves the security with respect to the first embodiment since it takes into account possible wrong detections and increases the possibility of blocking the component at different locations in the process. In fact, at the beginning of the program, the protection is only really activated after a test of the two counters, which enables making sure that the sole counter ANTI_TEAR_CNT is not incidentally in a forbidden state.

The action taken by the microcontroller after a fraud detection may be a definitive blocking of the component or a temporary blocking until reset, or any other action conventionally taken in a fraud detection situation.

Of course, the present invention is likely to have various alterations, modifications, and improvements which will readily occur to those skilled in the art. In particular, although the present invention has been more specifically described in relation with a smart card with contacts, it more generally applies to any microcontroller integrating at least a RAM and a non-volatile memory and for which the output of critical information that it contains is desired to be protected.

Further, the increment steps of the counter(s) may be different from their decrement steps.

Moreover, the practical implementation of the present invention, including the updating in non-volatile memory of the different used counters, is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting at least one section of a program executed by a microcontroller, comprising:
    before execution of the at least one section, decrementing or incrementing at least one counter and storing a state of the at least one counter in a non-volatile memory of the microcontroller;
    when an attack attempt is detected by the microcontroller, activating a flag in a RAM of the microcontroller, wherein the activation of the flag in the RAM is not detectable by an attacker performing the attack attempt;
    at the end of the execution of the at least one section, checking a state of the flag;
    if the state of the flag is active, executing an action against the attack attempt; and
    if the state of the flag is not active:
        if the at least one counter was decremented, incrementing the at least one counter; and
        if the at least one counter was incremented, decrementing the at least one counter.

2. The method of claim 1, wherein the state of the first counter is checked against a first threshold before execution of said section to implement a protection reaction in case the threshold is exceeded.

3. The method of claim 2, wherein said checking is also performed before providing information at the microcontroller input/output.

4. The method of claim 2, wherein said first threshold is set to a value randomly selected from a range.

5. The method of claim 1, wherein a second counter is decremented or incremented if flag is, at the end of the program section, not activated.

6. The method of claim 5, wherein the second counter is tested against a second threshold before execution of the program section.

7. The method of claim 5, wherein the second counter is incremented at the end of the execution of said program section.

8. The method of claim 1, wherein an initial state of the first counter is set to a value randomly selected from a range.

9. A microcontroller for executing a program comprising at least one program section, the microcontroller comprising:
    a central unit;
    a random access memory (RAM);
    an input/output port; and
    a non-volatile memory, wherein at least one area of the non-volatile memory is intended for storage of a state of at least one counter for implementation of a method for protecting the at least one program section, the method comprising:
        before execution of the at least one program section, decrementing or incrementing the at least one counter and storing the state of the at least one counter in the non-volatile memory;
        when an attack attempt is detected by the microcontroller, activating a flag in the RAM, wherein the activation of the flag in the RAM is not detectable by an attacker performing the attack attempt;

at the end of the execution of the at least one program section, checking a state of the flag;

if the state of the flag is active, executing an action against the attack attempt; and if the state of the flag is not active:
  if the at least one counter was decremented, incrementing the at least one counter; and
  if the at least one counter was incremented, decrementing the at least one counter.

10. The microcontroller of claim 9, wherein the state of the first counter is checked against a first threshold before execution of the at least one program section to implement a protection reaction if the first threshold is exceeded.

11. The microcontroller of claim 10, wherein the checking is also performed before providing information at a microcontroller input/output.

12. The microcontroller of claim 11, wherein the first threshold is set to a value randomly selected from a range.

13. The microcontroller of claim 9, wherein a second counter is decremented or incremented if, at the end of the at least one program section, the flag is not active.

14. The microcontroller of claim 13, wherein the second counter is tested against a second threshold before execution of the at least one program section.

15. The microcontroller of claim 13, wherein the second counter is incremented at the end of the execution of the at least one program section.

16. The microcontroller of claim 9, wherein an initial state of the first counter is set to a value randomly selected from a range.

* * * * *